Dec. 30, 1952          L. H. KENNON          2,623,797
PISTON RING
Filed Aug. 22, 1949
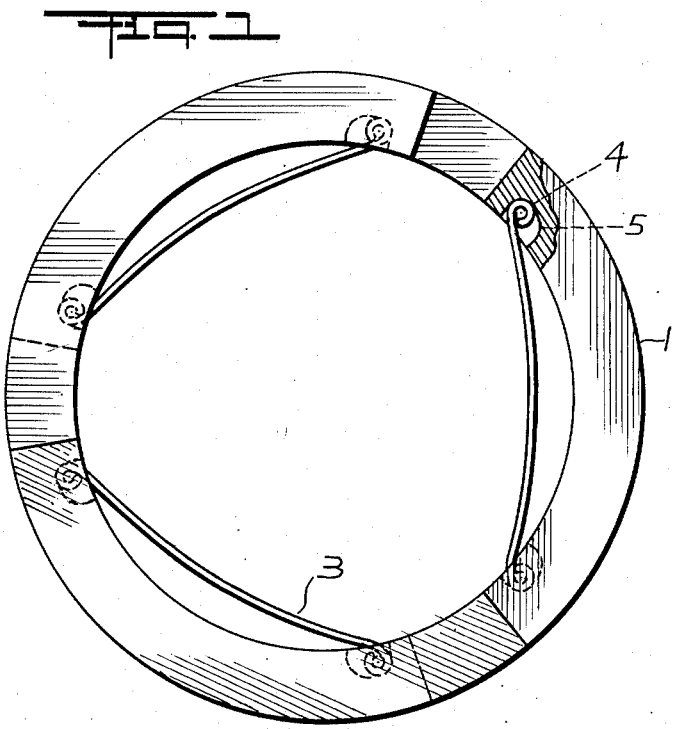
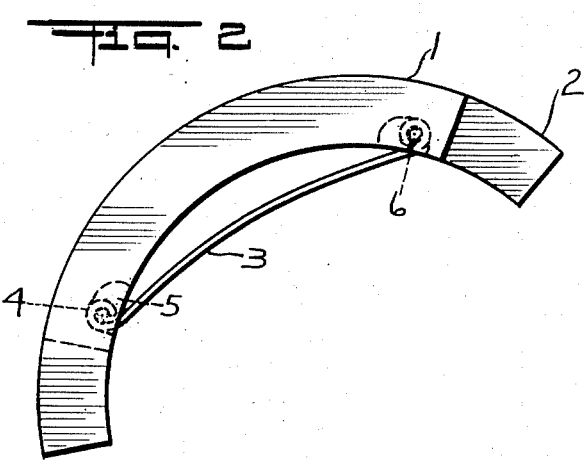
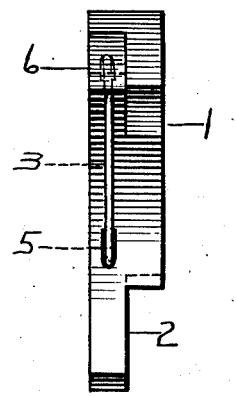
INVENTOR.
*Louis H. Kennon*
BY
*E. V. Hardway*
ATTORNEY Patented Dec. 30, 1952

2,623,797

UNITED STATES PATENT OFFICE 2,623,797

PISTON RING

Louis H. Kennon, Houston, Tex., assignor to Clyde L. Vickers, Galveston County, Tex.

Application August 22, 1949, Serial No. 111,641

2 Claims. (Cl. 309—29)

This invention relates to a piston ring.

An object of the invention is to provide a sectional piston ring so constructed that, when assembled, the sections in the ring will expand to closely follow the walls of the cylinder.

A further object of the invention is to provide slots in the end portions of each ring section to receive the novel ends of expanders to be inserted therein to force the sections of the assembly uniformly outwardly against the cylinder walls.

A further object of the invention is to provide novel means on the ends of the expanders to provide a smooth and efficient bearing or contact with said slots.

Another object of the present invention is to provide retaining means in one of said slots to prevent the end of the expander from slipping out of its slot.

Other objects and advantages will be apparent from the following specification which is illustrated by the accompanying drawings, wherein:

Figure 1 is a side elevational view of a sectional type of piston ring, shown partly in section.

Figure 2 is a side elevational view of a single section showing the retaining means or the anchor pin secured in the slot, also shown partly in section.

Figure 3 is an inside view of one section of the ring.

Referring now more particularly to the drawings, wherein like numerals of reference designate the same parts in each of the figures, the numeral 1 designates a ring section which is arcuate in shape. The ends of each section are provided with reversely arranged recesses, and also with extensions 2, 2, the extension of one section fitting into the recess of the adjacent section. Thus, when the sections are assembled in a complete ring, as shown in Figure 1, the ends will overlap.

As shown in Figure 1, an expander 3 is provided for each section of the assembled ring. These expanders are of an arcuate shape between the ends and are preferably formed of durable spring wire. Their ends may be bent into shape to form the eyes or other curved surfaces 4, 4.

The slots 5, 5 are provided adjacent the end portions of the ring section 1 to receive surfaces 4, 4 of the expander 3.

An anchor pin 6 may be secured in one slot for the purpose of snugly fitting through an eye 4, so as to prevent the expander from becoming detached. The slots may be disposed as shown in the drawings, or at any other place on the section in order to accomplish the desired purpose.

In operation, the assembled piston ring is mounted on a piston. The expanders, secured in the slots of the sections as above described, will be forced outwardly by the piston adjacent the inner surfaces of the ring sections. This places the expanders under tension which constantly tends to expand the rings so that they will be maintained in close contact with the cylinder walls irrespective of wear on the outer surfaces of the piston rings or on the cylinder walls and, as this wear occurs, the expanders will constantly expand the piston rings to take up the wear.

The necessity for the positive and efficient action as produced by the slots and the eyes on the ends of the expanders, as above described, is obvious. In the operation of the assembled piston ring on a piston it is apparent that the expanders will be subjected to considerable strain but they must remain in secure contact with the assembled sections. Such novel means covered by this invention meet this need in that the slots snugly receive the eyes of the expander and, in turn, the eyes of the expander provide a smooth bearing against the walls of the slots whereby the expander cannot turn and become loose or displaced.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

I claim:

1. An expansible piston ring comprising, a plurality of sections of arcuate shape formed at their ends to be arranged in staggered relationship to form substantially a circle when assembled, each section having elongated slots formed therein, a flexible, arcuate-shaped expander for each section whose ends are shaped in the form of eyes which fit snugly into said slots and anchor means in one of the slots of each section pivotally anchoring one end of one of the expanders therein, the opposite end of the expander being freely movable in the other slot of the section.

2. In combination, a piston ring formed of expansible arcuate sections with reversely arranged, stepped, extensions at their ends to permit said sections to be arranged, with the extensions in staggered relationship, to form a substantially circular ring, said sections having elongated, widened slots formed therein, flexible expanders having eye-shaped ends with openings therein adapted to fit into said slots, and an anchor pin in a slot of each section extending through the corresponding end of the expander to pivotally connect the expander to the section, the other end of the expander being freely movable in another slot of the section.

LOUIS H. KENNON.

REFERENCES CITED

The following references are of record in the file of this patent:

UNITED STATES PATENTS

| Number | Name | Date |
| --- | --- | --- |
| 87,789 | Morgan | Mar. 16, 1869 |
| 1,374,206 | Jacob | Apr. 12, 1921 |
| 1,607,779 | Norton | Nov. 23, 1926 |
| 2,038,515 | Marien | Apr. 21, 1936 |
| 2,078,395 | Luthy | Apr. 27, 1937 |
| 2,177,110 | Hopple | Oct. 24, 1939 |